United States Patent
Hasegawa

[19]

[11] Patent Number: 5,878,354
[45] Date of Patent: Mar. 2, 1999

[54] PORTABLE TELEPHONE SET USABLE AS A PAGING RECEIVER FOR REMOTE NOTIFICATION AND RESPONSE TO CALLS AND MESSAGES

[75] Inventor: Yoshiyuki Hasegawa, Tokyo, Japan

[73] Assignee: NEC Corporation, Tokyo, Japan

[21] Appl. No.: 870,204

[22] Filed: Jun. 6, 1997

Related U.S. Application Data

[63] Continuation of Ser. No. 447,919, May 23, 1995.

[30] Foreign Application Priority Data

May 23, 1994 [JP] Japan .................................. 6-108367

[51] Int. Cl.⁶ .................................................... H04B 7/26
[52] U.S. Cl. ........................... 455/567; 455/575; 455/458; 455/38.2
[58] Field of Search ...................................... 455/567, 550, 455/575, 38.2, 38.4, 11.1, 66, 74, 90, 100, 233.1, 343, 344, 420; 379/38, 52, 61, 67, 87, 88, 59, 373, 376; 340/539, 573, 825.36, 825.44, 825.46

[56] References Cited

U.S. PATENT DOCUMENTS

| | | | |
|---|---|---|---|
| 3,986,119 | 10/1976 | Hemmer, Jr. et al. | 455/233.1 |
| 4,352,091 | 9/1982 | Yamasaki | 455/89 |
| 4,421,953 | 12/1983 | Zielinski | 340/825.46 |
| 4,542,262 | 9/1985 | Ruff | 379/38 |
| 4,833,709 | 5/1989 | Pasinski et al. | 379/376 |
| 4,881,259 | 11/1989 | Scordato | 379/61 |
| 4,961,216 | 10/1990 | Baehr et al. | 379/57 |
| 5,007,105 | 4/1991 | Kudoh et al. | 455/344 |
| 5,029,198 | 7/1991 | Walpole et al. | 379/67 |
| 5,040,204 | 8/1991 | Sasaki et al. | 379/61 |
| 5,117,449 | 5/1992 | Metroka et al. | 379/57 |
| 5,148,473 | 9/1992 | Freeland et al. | 379/57 |
| 5,181,023 | 1/1993 | Fujii | 340/825.44 |
| 5,404,391 | 4/1995 | Wavroch et al. | 379/59 |
| 5,592,532 | 1/1997 | Koizumi | 379/61 |

FOREIGN PATENT DOCUMENTS 62-161228 7/1987 Japan .................................. 455/11.1

*Primary Examiner*—Reinhard J. Eisenzopf
*Assistant Examiner*—Lester G. Kincaid
*Attorney, Agent, or Firm*—Sughrue, Mion, Zinn, Macpeak & Seas, PLLC

[57] ABSTRACT

A portable telephone set for transmitting and receiving signals has an alarm element for generating an alarm signal in response to a preassigned call signal. The alarm element can be selectively put into a silent mode without generation of a ringing tone. The telephone set comprises a main unit for transmitting and receiving the signals containing the call signal, and a subunit, remote from and coupled to the main unit either electronically or by a cable, for mutually communicating with the main unit. The subunit receives the alarm signal when the alarm element is in the silent mode and produces an indication at the subunit that the main unit has received a preassigned call signal. The subunit can also include means for sending commands to the main unit.

23 Claims, 13 Drawing Sheets

PORTABLE TELEPHONE SET USABLE AS A PAGING RECEIVER FOR REMOTE NOTIFICATION AND RESPONSE TO CALLS AND MESSAGES

This is a Continuation of Application Ser. No. 08/447,919 filed May 23, 1995.

BACKGROUND OF THE INVENTION

The present invention relates to a portable telephone set for use in carrying out communication though a radio channel like a paging receiver.

Recently, portable telephone sets of the type described have become widely used to carry out communication between a possessor or owner of the portable telephone set and a subscriber of a telephone network system through a radio channel. Such portable telephone sets have become smaller in size and very convenient.

It is essential that a conventional portable telephone set should carry out not only transmission of a radio signal but also reception. This means that a restriction is imposed on miniaturization of the conventional portable telephone set.

Such a portable telephone set can not always be carried by the possessor or owner, who is collectively referred to as a bearer, but may often be remote from the bearer. For example, when the bearer takes a bath, the bearer can not carry the portable telephone set insofar as the portable telephone set does not have a water proof structure.

Even if the portable telephone set has a water proof structure, the portable telephone device is too large to be fitted to the human body when swimming and washing. If the telephone set is not located near the bearer, the portable telephone set can not stop ringing because the bearer can not notice generation of the ringing tone.

In addition, the bearer might be put into a situation such that a response to a call can not be practically made even when the portable telephone set is carried by the bearer. For instance, consider the case where the bearer attends a meeting or a colloquium while holding the portable telephone set. In this situation, if the portable telephone set has an alarm element for generating a ringing tone, such a ringing tone might be noisy.

Thus, it often happens that the bearer might know about reception of a call and not always respond to a call like a paging receiver.

SUMMARY OF THE INVENTION

It is an object of the present invention to provide a portable telephone set capable of coping with a wide variety of situations where the portable telephone set is used.

It is another object of the present invention to provide a portable telephone set of the type described, with improved portability.

It is still another object of the present invention to provide a portable telephone device which can be used in a noisy place.

It is yet another object of the present invention to provide a portable telephone set of the type described, which is usable not only as a portable telephone but also as a paging receiver.

According to one aspect of the present invention, there is provided a portable telephone set for transmitting and receiving radio signals through radio channels and having an alarm element for generating an alarm signal in response to a preassigned call signal. The alarm element is selectively put into a silent mode when the preassigned call signal is received, without generation of a ringing tone. In this aspect of the present invention, the portable telephone set comprises a main wireless unit for transmitting and receiving the radio signals containing the call signal through the radio channels and a subunit coupled to the main wireless unit, for mutually communicating with the main wireless unit.

According to another aspect of the present invention, there is provided a main wireless unit of a portable telephone set for transmitting and receiving radio signals through radio channels and having an alarm element for generating an alarm signal in reference to a preassigned call signal. The alarm element is selectively put into a silent mode when the preassigned call signal is received, without generation of a ringing tone. In this aspect of the present invention, the main wireless unit comprises alarm signal transmitting means for transmitting an alarm signal to a subunit electrically coupled to the main wireless unit for mutually communicating with the main wireless unit when the main wireless unit receives the call signal.

According to still another aspect of the present inventing, there is provided a subunit of a portable telephone set which transmits and receives radio signals in relation to a base station and has alarm means for transmitting an alarm signal at the reception of a call signal from a subscriber in a state selective of a silent mode. The telephone set comprises a main wireless unit for transmitting and receiving radio signals through radio channels of the base station and the subunit mutually communicating with the main wireless unit. In this aspect of the invention, the subunit comprises alarm signal receiving means for receiving the alarm signal transmitted from the main wireless unit by use of a radio signal or an electrical signal.

DESCRIPTION OF PREFERRED EMBODIMENTS

Figure 1:
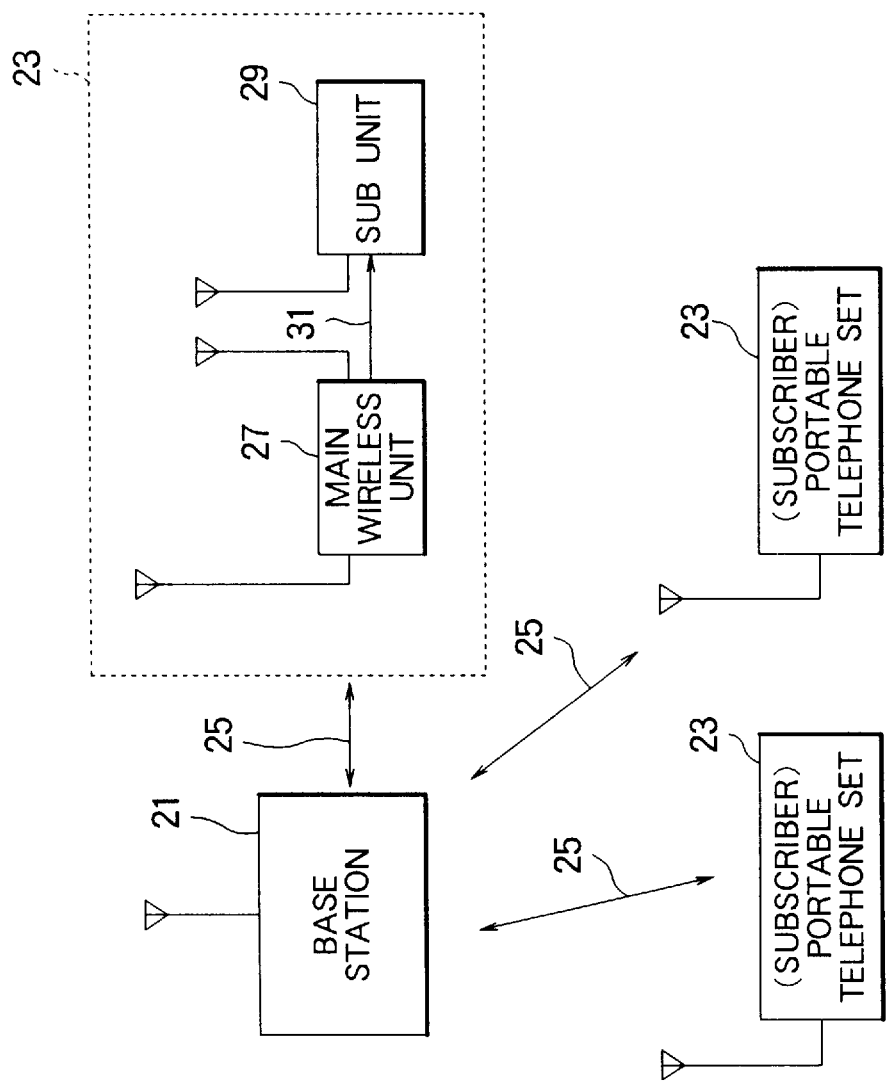
FIG. 1 is a block diagram of a portable telephone system according to the present invention.

A portable telephone system to which the present invention is applicable will now be described. In FIG. 1, the portable telephone system comprises a base station 21 and a plurality of portable telephone sets 23, each of which is similar in structure and operation to one another and is allocated among each of subscribers. Therefore, a single one of the portable telephone sets 23 depicted at a broken line above will be described as a representative of the portable telephone sets 23 hereinunder.

The portable telephone set 23 transmits and receives a main radio signal 25 through a predetermined one of radio channels to and from the base station 21.

In the illustrated example, it is to be noted that the portable telephone set 23 comprises a main wireless unit 27 and a subunit 29 both of which communicate with each other in the portable telephone set 23 in a manner to be described later. The main wireless unit 27 transmits and receives a subsidiary radio signal 31 which carries a calling signal of the main radio signal 25 sent from one of the subscribers and which is sent though a predetermined subsidiary radio channel. At any rate, the subunit 29 is coupled to the main wireless unit 27 through the predetermined subsidiary radio channel within the portable telephone set 23.

Figure 2:
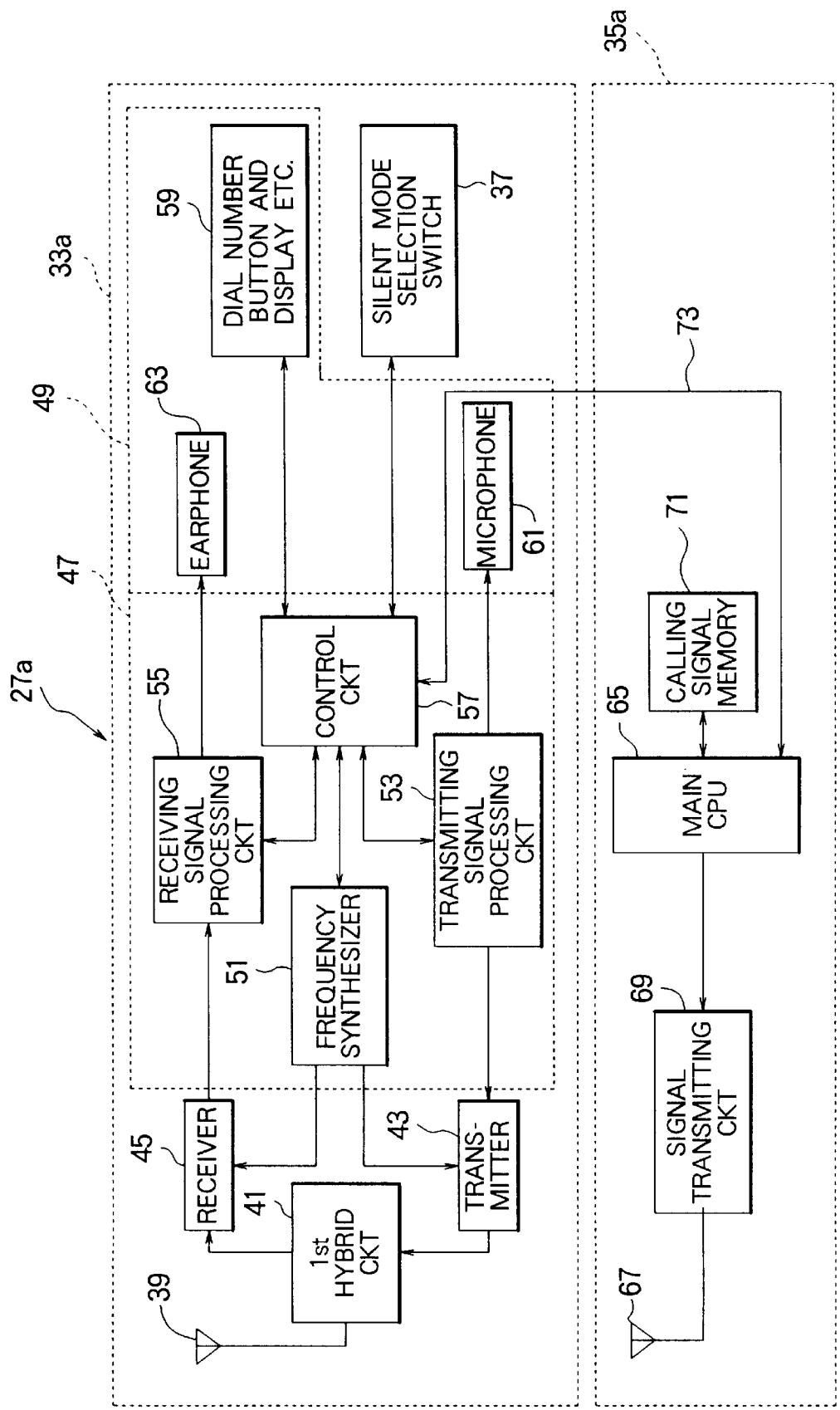
FIG. 2 is a block diagram of a main wireless unit according to a first embodiment of this invention.

Referring to FIG. 2, the main wireless unit 27a comprises a portable telephone portion 33a and an inner communication circuit portion 35a. The portable telephone portion 33a has a silent node selection switch 37 for selecting a silent mode in which the portable telephone set 23 receives the calling signal without generating the ringing tone. The inner communication circuit portion 35a automatically generates an alarm signal in response to the subsidiary signal and transmits the same to the subunit 29 when the calling signal is received from the base station 21 with the silent mode selected.

More specifically, the portable telephone portion 33a compresses an antenna 39, a first hybrid circuit 41, a transmitter 43, a receiver 45, a control portion 47, and a telephone unit 49. The control portion 47 comprises a frequency synthesizer 51, a transmitting signal processing circuit 53, a receiving signal processing circuit 55, and a control circuit 57. The telephone unit 49 comprises a dial number button portion and/or display 59, a microphone 61, and an earphone 63. The inner communication circuit portion 35a comprises a main central processing unit (CPU) 65, a transmitting antenna 67, a signal transmitting circuit 69, and a calling signal memory 71.

In the portable telephone portion 33a described above, the main radio signal 25 is received as an input signal or transmitted as an output signal through the antenna 39. The transmitter 43 modulates and amplifies a voice signal and data, and supplies the output signal to the antenna 39. O the other hand, the receiver 45 demodulates the input signal into a received voice and data signal.

The control portion 47 is formed by a microprocessor and is operable to control a channel connection to the base station 21, to change a channel from one to another, and to register a position of the portable telephone set 23 in the area of the base station 21.

The control circuit 57 is operable to control the frequency synthesizer 51 for generating a plurality of frequencies.

Furthermore, the control circuit 47 serves as an interface circuit to operate the inner communication circuit portion 35a in the portable telephone portion 33a.

When a bearer selects the silent mode by operating the portable telephone set 23 and the calling signal of the main radio signal is received from the base station 21, the control circuit 57 supplies a command signal to the main CPU 65 of the inner communication circuit portion 35 through a signal bus 73.

Responsive to the command signal, the main CPU 65 reads and alarm signal out of the calling signal memory 71 and transmits an output signal from the signal transmitting circuit 69 to the subunit 29. Specifically, the signal transmitting circuit 69 transmits the subsidiary radio signal to the subunit 29 in the form of the alarm signal through the transmitting antenna 67. The alarm signal informs the subunit 29 of reception of the main calling signal. Therefore, the control circuit portion 57, the main CPU 65, the calling signal memory 71, the signal transmitting circuit 69, and the antenna 67 form an alarm signal transmitting arrangement.

Figure 3:
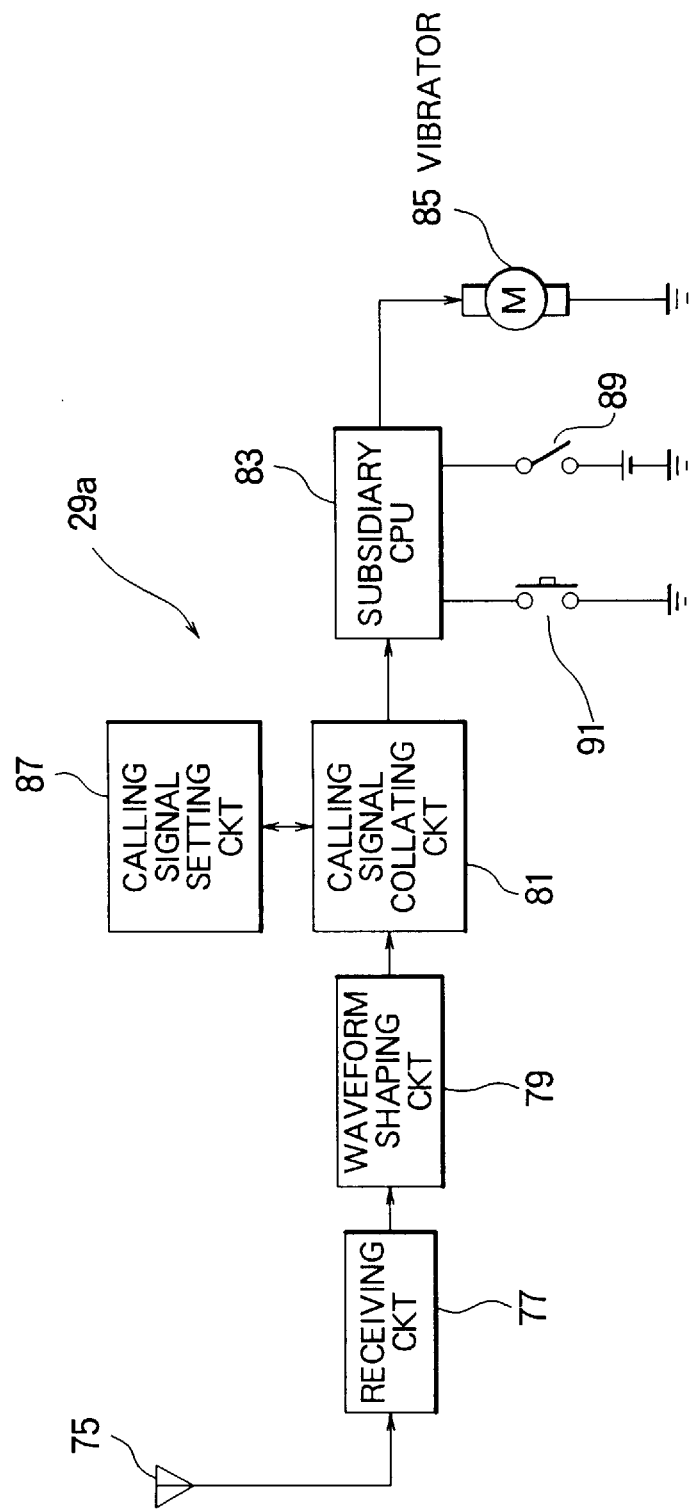
FIG. 3 is a block diagram of a subunit coupled to the main wireless unit of FIG. 2.

Referring to FIG. 3 together with FIG. 2, the subunit 29a comprises an antenna unit 75, a receiving circuit 77, a waveform shaping circuit 79, and a calling signal collating circuit 81 all of which are connected in cascade to one another in a manner as illustrated in FIG. 3. The calling signal collating circuit 81 is connected to an input side of a subsidiary central processing unit (CPU) 83. In addition, a vibrator 85 is connected to an output side of the subsidiary CPU 83. Furthermore, a calling signal setting circuit 87 is connected to the calling signal collating circuit 81. A power switch 89 and a reset switch 91 are also connected to the subsidiary CPU 83.

In the illustrated example, the receiving circuit 77, the waveform shaping circuit 79, the calling signal collating circuit 81, the calling signal setting circuit 87, and the subsidiary CPU 83 are operable to receive the alarm signal and may be referred to as an alarm signal receiving arrangement. Therefore, a combination of the alarm signal receiving arrangement and the alarm signal transmitting arrangement forms an alarm element of the portable telephone set 23.

Figure 4:
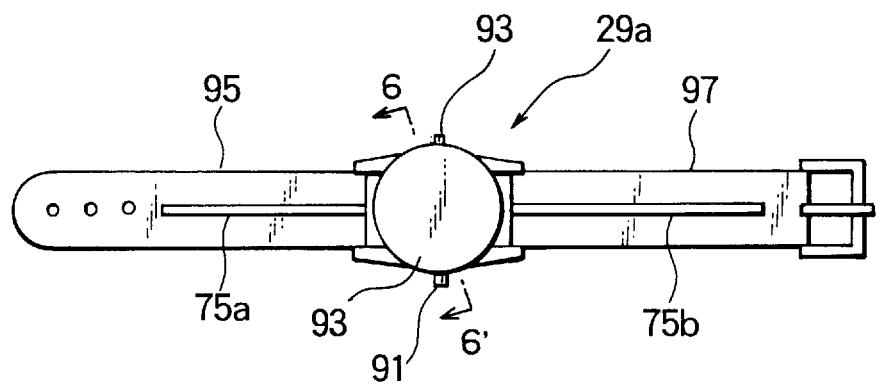
FIG. 4 is a plan view of the subunit of FIG. 3.
Figure 5:
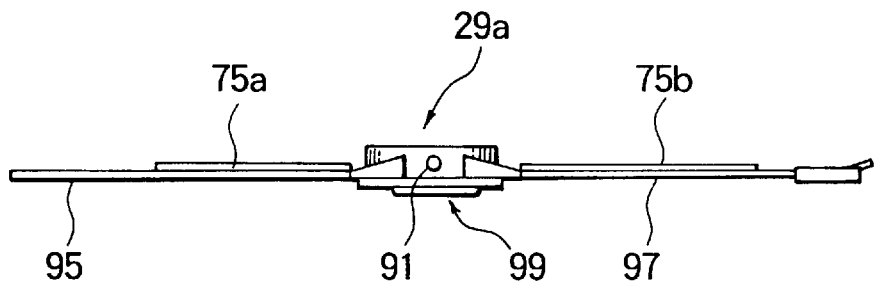
FIG. 5 is a side view of the subunit of FIG. 4.
Figure 6:
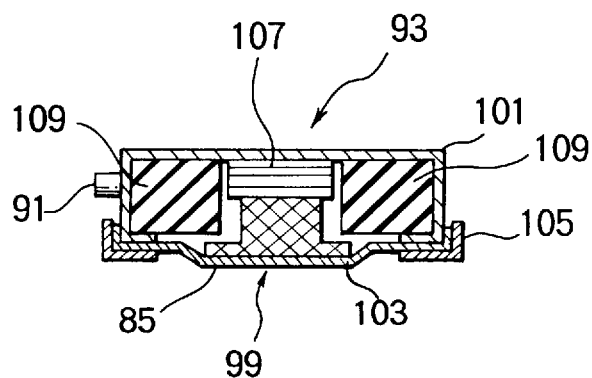
FIG. 6 is a sectional view taken along a line 6—6' of FIG. 4.

Referring to FIGS. 4 to 6, a subunit 29a according to a first embodiment of this invention can be used as the subunit shown in FIG. 3 and comprises portions which are similar to those illustrated in FIG. 3 and which are therefore represented by the same reference numbers of FIG. 3.

In FIGS. 4 and 5, the subunit 29a is of a wrist watch type and comprises the reset switch 91 and the power switch 89 in FIG. 3. In addition, the illustrated subunit 29a further comprises a vibration casing body 93, belts 95 and 97, a contacting portion 99 which serves as a stimulus providing element put in contact with the skin or a wrist of the bearer, and antenna portions 75a and 75b. The antenna portions 75a and 75b collectively form the antenna unit 75 shown in FIG. 3 and are composed of metal films formed on the belts 95 and 97. The antenna portions 75a and 75b are located on the opposite sides of the wrist.

In FIG. 6, the vibration casing body 93 comprises a cylindrical portion 101, a vibration plate 103, and a bottom plate 105. The vibration casing body 93 also encapsulates a battery 107, the vibrator 85, and an electrical circuit portion 109. The electrical circuit portion 109 is operable in response to reception of an alarm signal from the main wireless unit 27a (as shown in FIGS. 2 and 3). In addition, the vibration plate 103 is formed of a thin film and is sandwiched between the cylindrical portion 101 and the bottom plate 105. The vibration plate 103 is fixed to the cylindrical portion 101 by the bottom plate 105. The subunit 29a may be modified in structure so far as the subunit 29a is of a wrist watch type.

Figure 7:
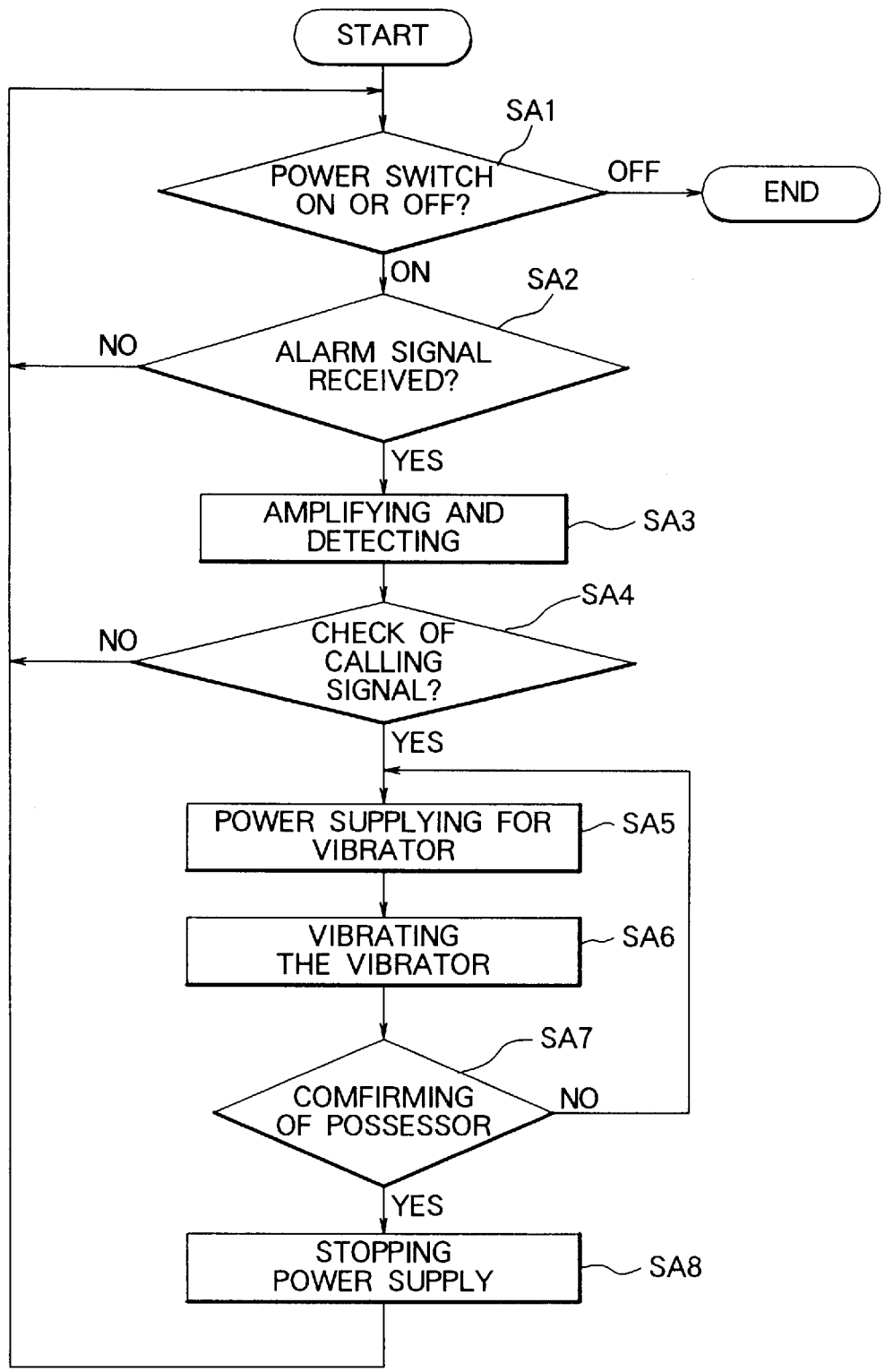
FIG. 7 is a flow chart for use in explaining an operation of the subunit shown in FIGS. 3 to 6.

An operation of the subunit 29a and, in particular, an operation of the alarm signal receiving arrangement illustrated in FIGS. 4 through 6 will be described in reference to FIG. 7.

When the subunit 29a is fitted to the human body, it is judged at a first step SA1 whether the power switch 89 is turned on or off to put the subunit 29a into a standby state awaiting reception. Specifically, when the power switch 89 is turned on, it is judged at a second step SA2 whether or not an alarm signal is received from the main wireless unit 27a. When the alarm signal is received as a received signal, the received signal is passed through the waveform shaping circuit 79 and is amplified to be detected by the calling signal collating circuit 81 at a third step SA3. It is judged at a fourth step SA4 whether or not the received signal is coincident with a predetermined setting signal which is set in the calling signal setting circuit 87 in the subunit 29a (FIG. 3). When the received signal is coincident with the predetermined setting signal, the subsidiary CPU 83 supplies electric power to the vibrator 85 to drive the vibrator 85 at a fifth step SA5. Thus, the vibrator 85 is vibrated by supply of electric power at a sixth step SA6. Next, it is judged at a seventh step SA7 whether or not the vibrator 85 is to continue to be driven. When the bearer notices the vibration, the bearer turns the reset switch 91 on momentarily. Then, power supply is stopped from the subsidiary CPU 83 to the vibrator 85 at an eighth step SA8, and the subunit 29a is put into a state of awaiting reception.

In short, the portable telephone set according to the first embodiment of this invention comprises a main wireless unit which has an alarm signal transmitting arrangement for transmitting the subsidiary radio signal to the subunit, and the subunit which has an alarm signal receiving arrangement for receiving the subsidiary radio signal transmitted from the main wireless unit.

Therefore, the portable telephone set 23 can be used during meetings, and during work or sports when the main wireless unit 27a can not be placed near the bearer, and can be used without discomfort when playing tennis, badminton, and table tennis. Since the subunit 29a is attached directly to the skin or a wrist of the bearer, the bearer can notice reception of the calling signal tone even when he or she is in a noisy place. Then the bearer is near a power source capable of charging the battery of the subunit 29a, the bearer can charge the battery of the subunit 29a. Therefore, charging the batter is not troublesome, and an interruption which might occur on consumption of the battery can be avoided.

When the silent mode is not selected in the portable telephone set 23 described above, the main wireless unit 27a is operable in a manner similar to a usual portable telephone set. With this structure, the subunit 29a is light in weight and small in size and can always be fitted to the human body.

Figure 8:
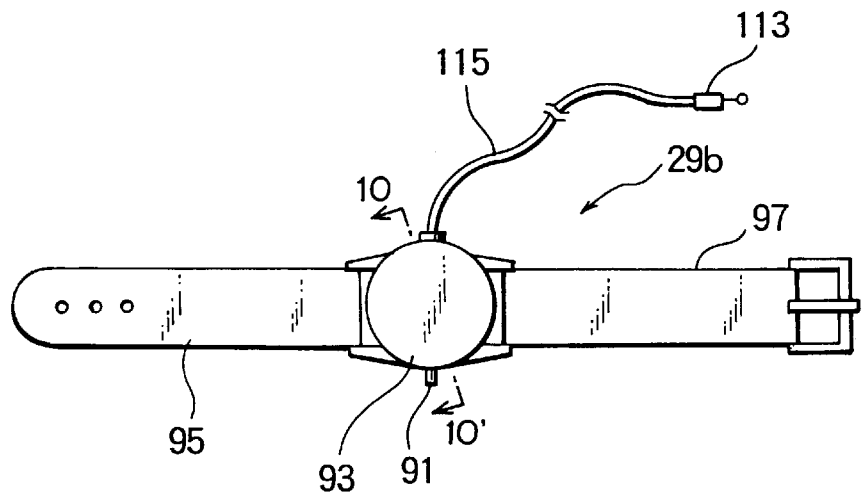
FIG. 8 is a plan view of a wrist-watch type subunit with a cable according to a second embodiment of this invention.
Figure 10:
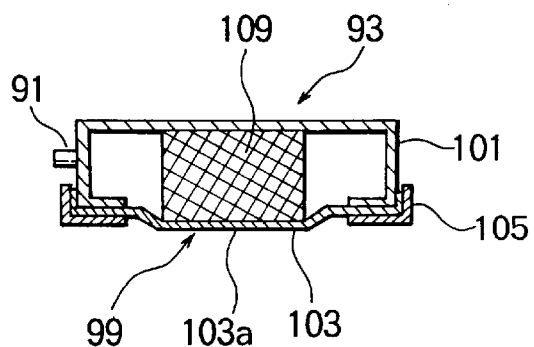
FIG. 10 is a sectional view taken along a line 10—10' of FIG. 8.

Referring to FIGS. 8 and 10, a subunit 29b according to a second embodiment of this invention comprises similar parts represented by the same reference numbers of FIGS. 3 to 6.

Figure 9:
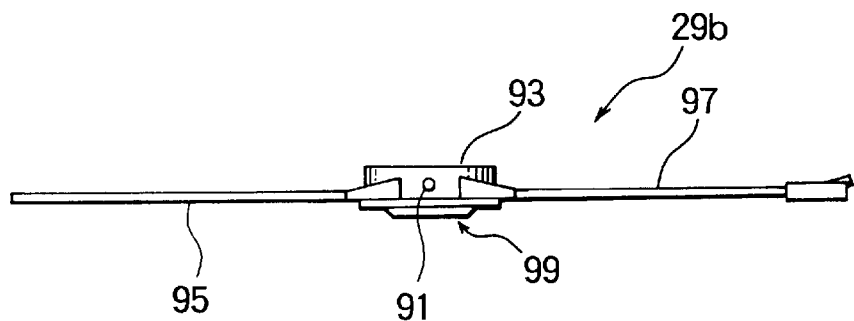
FIG. 9 is a side view of the subunit of FIG. 8.

In FIGS. 8 and 9, a subunit (depicted as 29b) is also operable to communicate with the main wireless unit 27 as in FIGS. 4 to 6. The main wireless unit 27a has the same structure as that shown in FIG. 2 and will not therefore be described in detail. It is noted that the subunit 29b comprises an attachment jack 113 connected to a vibration casing body 93 through a cable 115 and does not have the electric circuit portion 109 (FIG. 6) composed of the receiving circuit 77, the waveform shaping circuit 79, the calling signal collating circuit 81, the calling signal setting circuit 87, the subsidiary CPU 83, the power switch 89, and the antenna 75.

Instead, the subunit 29b is directly connected to the main CPU 65 of the main wireless unit 27a of FIG. 2 through the cable 115 and a connector which is placed in the main wireless unit 27a and coupled to the attachment jack 113. The vibration casing body 93 is attached to a pair of belts 95 and 97 on both ends thereof, like a usual wrist watch. The pair of belts 95 and 97 serves as a fitting element for fitting the body 93 to the skin or a wrist of the bearer. The vibration casing body 93 has the reset switch 91 implemented by a push button projecting from one side of the body 93. On the bottom of the vibration casing body 93, a contact portion 99 which serves as a stimulus providing element is brought into contact with the skin or the wrist to give a vibration as described in conjunction with FIGS. 4 to 6.

In FIG. 10, the vibration casing body 93 has a cylindrical portion 101, a bottom plate 105, and a vibration plate 103 as in FIG. 6. The cylindrical portion 101 and the bottom plate 105 are fastened by screwing the cylindrical portion into the bottom plate 105. The vibration plate 103 has a center portion 103a projected downwards of FIG. 10. Like in FIG. 8, a vibrator 85 (not shown in FIG. 10) is contained in the vibration casing body 93. The vibration plate 103 is formed of an elastic thin film and is made from a resin material, such as Teflon (i.e., polytetrafluoroethylene resin), polypropylene or another resin. In addition, the vibration plate 103 is sandwiched between the bottom plate 105 and the cylindrical portion 101, and fixed by screw portions in a manner similar to that described in conjunction with FIG. 6.

When a bearer uses the subunit 29b, the attachment jack 113 is connected to the body of the main wireless unit (not shown). In this event, the subunit 29b is fitted around the wrist of the bearer by the belts 95 and 97 so that the contact portion 99 may contact the skin of the bearer. When the attachment jack 115 is inserted to the main wireless unit, the alarm element is automatically placed in a silent mode.

When the main wireless unit 27 (FIG. 1) receives a calling signal through a main radio channel, electric power is supplied through the cable 115 to the vibrator 85 of the subunit 113 to generate a vibration. The vibration stimulates the skin of the bearer through the vibration plate 103. As a result, the bearer confirms reception of the calling signal from a subscriber by sensing the vibration. Thereafter, the bearer pushes on the reset switch 91 to stop supplying electric power to the vibrator 85. Therefore, the bearer can respond to the calling signal by the use of the main wireless unit 27.

In short, the portable telephone set according to the second embodiment of this invention comprises the silent mode selection switch, which can select a silent mode at least as an alarm element. When the bearer selects the silent mode and the main wireless unit receives a calling signal transmitted from the base station of the portable telephone system, the portable telephone set activates the alarm element which transmits the alarm signal through a cable. The subunit comprises a receiving element for receiving the alarm signal, a fitting element for fitting to a human body, and a stimulating element for providing a stimulus to the wrist.

In the manner being described, the bearer can notice reception of the calling signal without generation of a noisy ringing tone and without impeding a meeting or the like. In the portable telephone set, the main wireless unit alone becomes active and serves as a normal portable telephone set 23 as shown in FIG. 1 when the attachment jack 113 is not put into the main wireless unit 27*b*.

A portable telephone set according to a third embodiment of this invention will now be described with reference to FIGS. 11 to 13 in which the same portions are represented by the same reference numbers. The portable telephone set 23 transmits a main radio signal to the base station 21 and receives the main radio signal from the base station 21 and comprises a main wireless unit 27 and a subunit 29*c*, both of which communicate with each other through subsidiary radio signals in a manner similar to that described in connection with FIG. 1.

Figure 11:
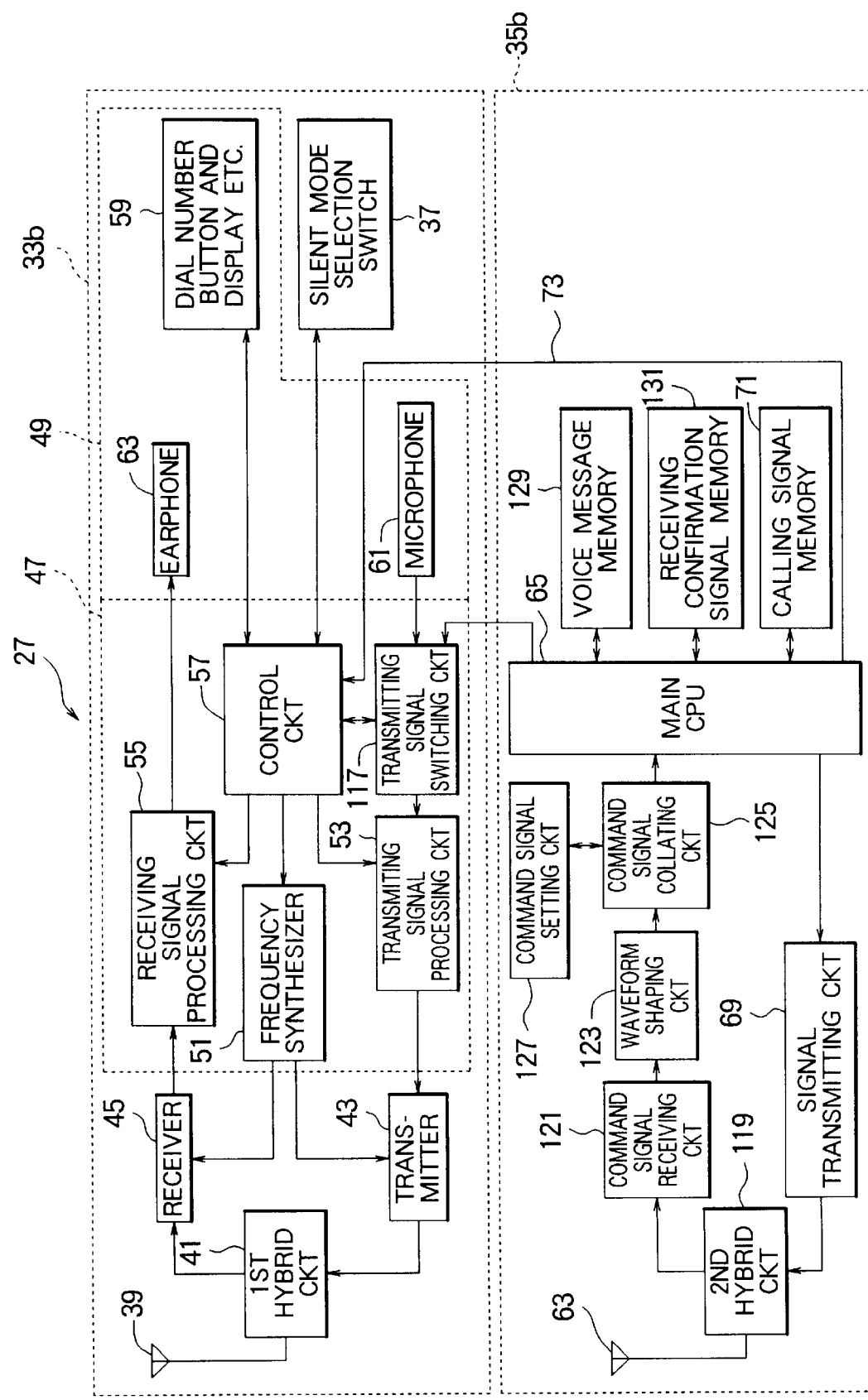
FIG. 11 is a block diagram of a main wireless unit of a portable telephone set according to this invention.

Referring to FIG. 11, the main wireless unit 27 comprises a portable telephone portion 33*b* and an inner communication circuit portion 35*b*. The portable telephone portion 33*b* comprises portions similar to those described in connection with FIG. 3 except for a transmitting signal switching circuit 117.

Specifically, the portable telephone portion 33*b* comprises the antenna 39, the first hybrid circuit 41, the transmitter 43, the receiver 45, the control portion 47, and the telephone unit 49 like in FIG. 3. The control portion 47 comprises the frequency synthesizer 51, the transmitting signal processing circuit 53, the receiving signal processing circuit 55, and the control circuit 57. The telephone unit 49 comprises the dial number button and/or display 59, the microphone 61, and the earphone 63 like in FIG. 2.

The inner communication circuit portion 35*b* is operable to transmit automatically an alarm signal in the form of an electromagnetic wave signal to a subunit 29*c* which will be described in detail later, when a calling signal is received through a main radio signal from the base station 21 (FIG. 1) and when the silent mode is selected. The inner communication circuit portion 35*b* is also operable to transmit a message input signal as a subsidiary radio signal to a calling subscriber through the base station 21 and a reception confirmation signal as a subsidiary radio signal to a subunit when a command signal is received through a subsidiary radio signal from the subunit 29*c*.

In the portable telephone portion 33*b*, the antenna 39 is operable to receive an electromagnetic wave signal as the main radio signal from the base station 21 (FIG. 1) and to transmit an output signal as the main radio signal of the transmitter 43 to the base station 21. The transmitter 43 modulates a voice or a data signal into a modulated signal and amplifies the same to a desirable transmitting output signal as the main radio signal. The receiver 45 demodulates a received main radio signal into a voice and data signal.

The control portion 47 is formed by a microprocessor (not shown) and controls each of a channel connection to the base station 21, a channel changing operation during a connection, and registration of a position of the portable telephone set. In addition, the control portion 47 also controls the frequency synthesizer 51, and an interface to the telephone unit 49.

The inner communication circuit portion 35*b* comprises an antenna 63, a second hybrid circuit 119, a command signal receiving circuit 121, a waveform shaping circuit 123, a command signal collating circuit 125, a command signal setting circuit 127, a main CPU 65, a voice message memory 129, a receiving confirmation signal memory 131, and a calling signal memory 71.

Figure 12:
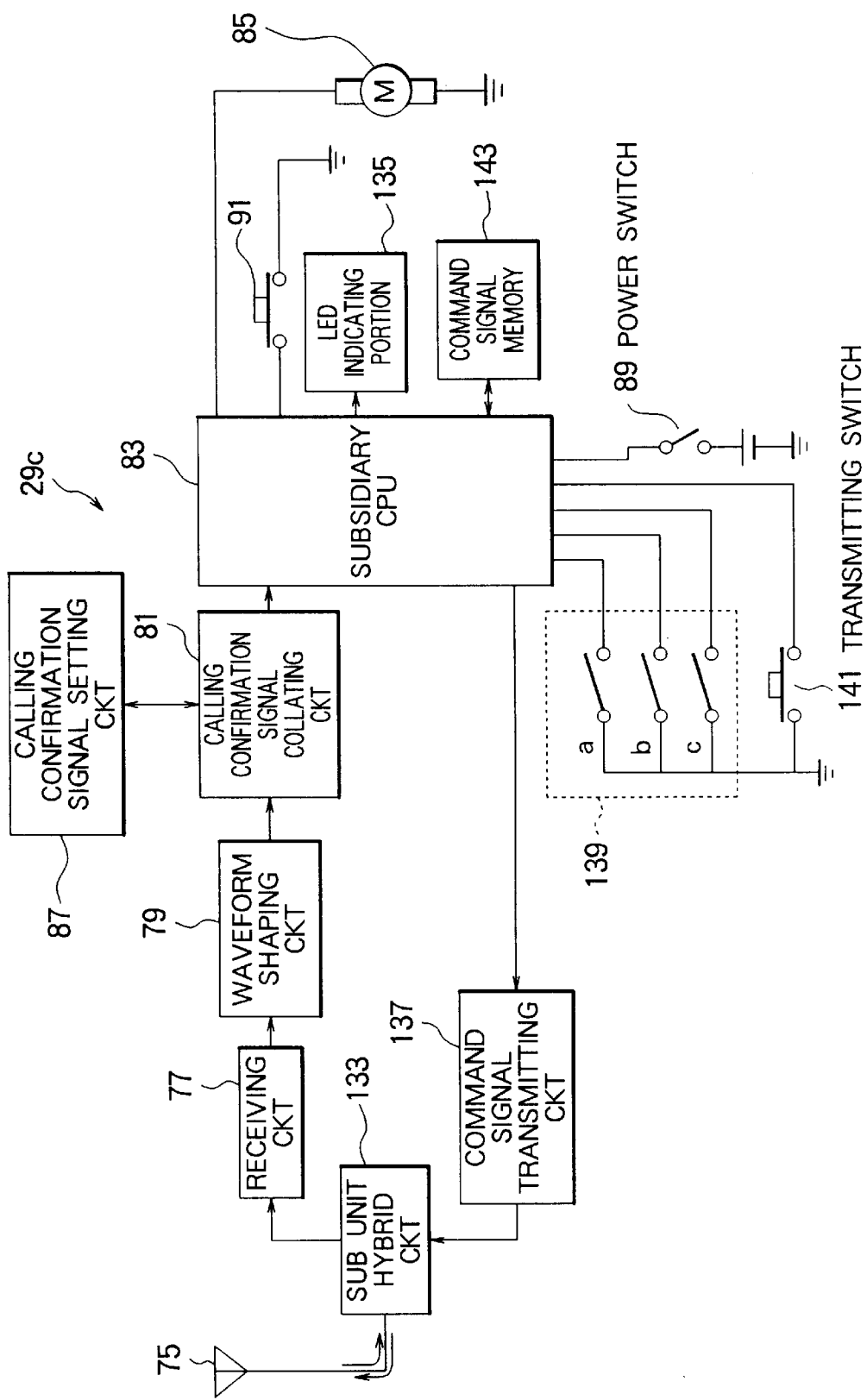
FIG. 12 is a block diagram of a subunit coupled to the main wireless unit of FIG. 11.

Referring to FIG. 12, the subunit 29*c* comprises an antenna 75, a subunit hybrid circuit 133, a receiving circuit 77, a waveform shaping circuit 79, a calling confirmation signal collating circuit 81, a calling confirmation signal setting circuit 87, a subsidiary CPU 83, a vibrator 85, a power switch 89, a LED indicating portion 135, a command signal transmitting circuit 137, a message selection switch 139, and a transmitting switch 141. To an output side of the subsidiary CPU 83, all of the vibrator 85, the LED indicating portion 135, and the command signal transmitting circuit 137 are connected in parallel to one another. From the signal transmitting circuit 137, a command signal is transmitted through the subunit hybrid circuit 133, and the antenna 75. To the calling confirmation signal collating circuit 81, the calling confirmation signal setting circuit 87 is connected for setting a predetermined confirmation signal. To the subsidiary CPU 83, the command signal memory 143 is connected. A setting signal side of the subsidiary CPU 83 is connected to the power switch 89, the reset switch 91, the message selection switch 139, and the transmitting switch 141 in parallel to one another.

An operation of the portable telephone set will be described with reference to FIGS. 11 and 12. When the silent mode is selected and a calling signal of the main radio signal is received from the base station 21 by the portable telephone portion 33*b*, the control circuit 57 generates a command signal to the main CPU 65.

Since an alarm signal is previously memorized by the calling signal memory 71, the main CPU 65 reads out the alarm signal in reference to the command signal and transmits the same as a calling signal from the calling signal memory 71 to the signal transmitting circuit 69. The signal transmitting circuit 69 transmits the alarm signal in the form of an electromagnetic signal to the subunit which will be described later in detail.

The alarm signal is received and is input through an alarm signal receiving arrangement to the subsidiary CPU 83. The alarm signal receiving arrangement is composed of the antenna 75, the subunit hybrid circuit 133, the receiving circuit 77, the waveform shaping circuit 79, and the calling confirmation signal collating circuit 81.

Figure 13:
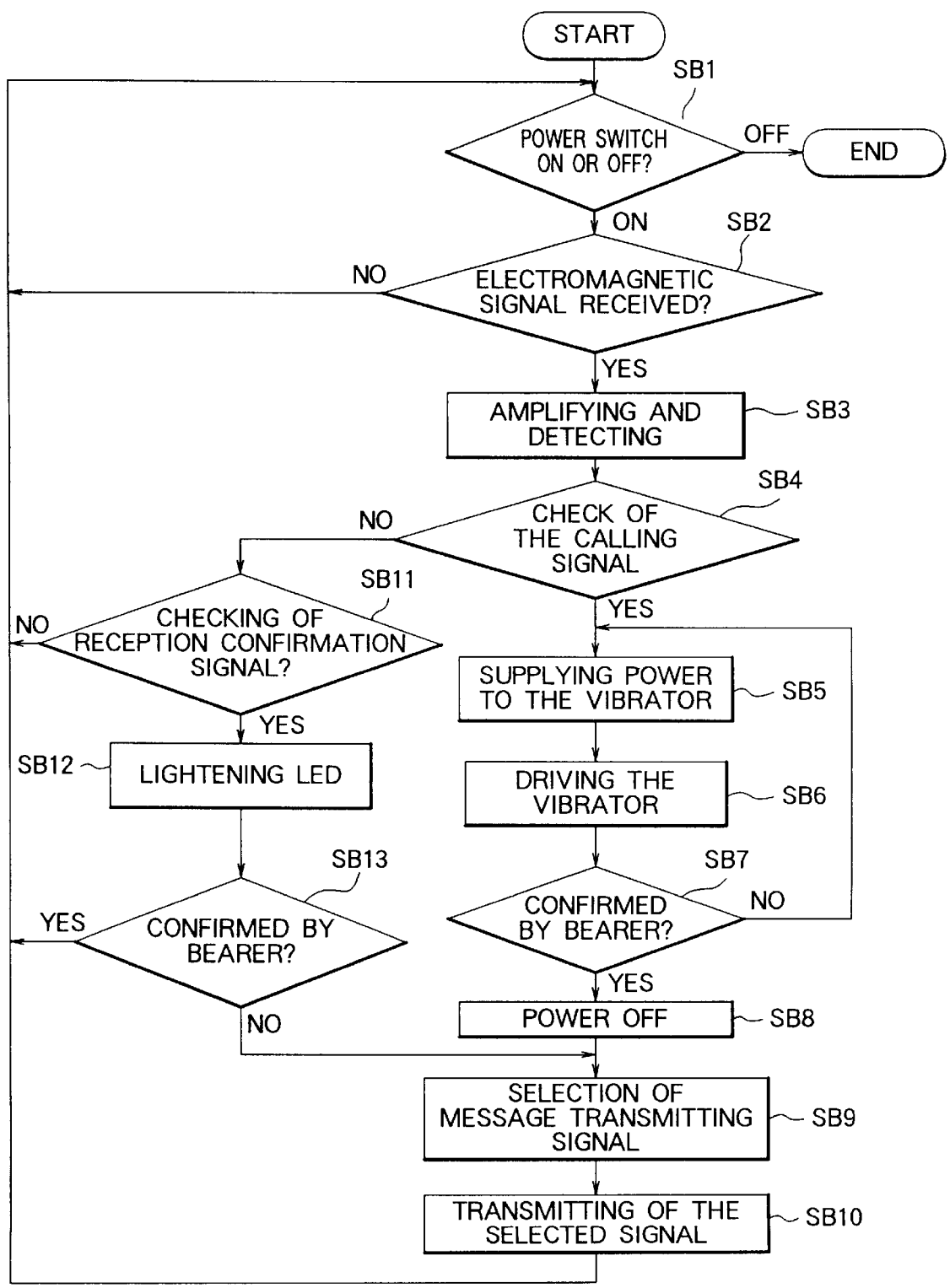
FIG. 13 is a flow chart for use in explaining an operation of the subunit shown in FIG. 12.

Referring to FIGS. 12 and 13, the bearer can fit the subunit 29*c* of FIG. 12 to their body, for example, a wrist. In FIG. 13, the portable telephone set can be put into a state of awaiting reception at a first step SB1. At this step SB1, it is judged whether the power switch is on or off. When the power switch is turned on, it is judged at a second step SB2 whether the subunit 29*c* receives the alarm signal from the main wireless unit or not. When the alarm signal is received as a received alarm signal, the received alarm signal is amplified and detected as a detected signal at a third step SB3. Then, the detected signal is input into the calling confirmation signal collating circuit 81. The calling confirmation signal setting circuit 87 judges at a fourth step SB4 whether the signal is coincident with a predetermined setting signal of the portable telephone set or not. When the signal is coincident with the predetermined setting signal, the subsidiary CPU 83 supplies drive electric power to a vibrator 85 at a fifth step SB5. The vibrator 85 is driven by the electric power at a sixth step SB6. Then, the bearer detects at a seventh step SB7 whether the vibrator 85 is vibrating or not. Thereafter, when the vibrator 85 is vibrating, the bearer stops vibration at an eighth step SB8 and selects one of the message selection switches a, b, and c by putting a selected switch into an on state at a ninth step SB9. The bearer turns the transmitting switch on for a moment at a tenth step SB10. In this state, the subsidiary CPU 83 selects one command signal corresponding to the selected message selection switch. Then, the subsidiary CPU 83 transmits the command signal to the command signal transmitting circuit 137. The command signal transmitting circuit 137 transmits the selected command signal through the subunit hybrid circuit 133 and the antenna 75 as a radio signal.

The main wireless unit 27 (FIG. 11) receives the selected command signal from the subunit 29c by the antenna 63. The command signal is input to the command signal collating circuit 125 through a second hybrid circuit 119, the command signal receiving circuit 121, and the waveform shaping circuit 123. When the command signal collating circuit 125 detects that the received command signal is identical with a preassigned signal, a voice message is read out of the voice message memory 129 in response to the command signal.

At the same time, a control signal is transmitted from the main CPU 65 to the control circuit 57. The control circuit 57 switches the transmitting signal switching circuit 117 from the microphone 61 to the main CPU 65.

Thereafter, the main CPU 65 reads out a voice message out of the voice message memory 129 and transmits the voice message to the transmitting signal switching circuit 117 so that the voice message is automatically transmitted to the subscriber through the transmitting signal processing circuit 53, the transmitter 43, the first hybrid circuit 41, and the antenna 39 to be formed into the form of main radio signal. After the main wireless unit 27 finishes the transmission of the main radio signal, a command signal is transmitted to the main CPU 65, which reads out a confirmation signal as a read out confirmation signal. The confirmation signal is previously input from the receiving confirmation signal memory 131. The main CPU 65 transmits the confirmation signal to the signal transmitting circuit portion 69. The confirmation signal is transmitted from the antenna 63 to the subunit 29c through the signal transmitting circuit 69 and the second hybrid circuit 119, then the main wireless unit 27b assumes the standby state of awaiting reception of the calling signal again. That is, the transmitting signal switching circuit 117 is automatically switched to the receiver 45.

In addition, the memory portion (not shown) of the main wireless unit 27 switches command a, b, and c corresponding to the input message A, B, C as well be described in detail later. Thereafter, when the main wireless unit 27 receives the command signal, the main wireless unit 27 transmits a receiving confirmation signal to the subunit 29c (FIG. 12).

When the subunit 29C receives the receiving confirmation signal as a subsidiary radio signal at the step SB2, the receiving confirmation signal is input into the calling confirmation signal collating circuit 81 through the waveform shaping circuit 79 as a received signal at the step SB3. The calling confirmation signal collating circuit 81 judges at the step SB4 whether the received signal corresponds to the alarm signal or not. The received signal does not correspond to the alarm signal, so that it is judged whether or not the signal is coincident with the confirmation signal at an eleventh step SB11. When the received signal corresponds to the confirmation signal, the subsidiary CPU 83 supplies electric power to the LED indicating portion 135 to lighten the same at a twelfth step SB 12.

When the LED indicating portion 135 lightens, the subunit 29C is put into a standby state of awaiting reception. In addition, when the LED indicating portion 135 is not lighted for a while, it is assumed that the main wireless unit did not receive the command signal. Therefore, the bearer may select one of a, b, and c of the message selection switches 139 to turn on at the ninth step SB9. Then, the transmitting switch may be turned on for a moment at the step SB10 so that the command signal is transmitted in a similar order to the above.

In this portable telephone set, a configuration of the subunit 29c is not shown in FIGS. 11 and 12. However, the subunit 29c may be a similar configuration to a wrist watch, shown in FIGS. 4 to 6. In this case, the subunit 29C may have a message selection switch 139, a transmitting switch 141, and the LED indicating portion 135. Alternatively, the subunit 29c may have another configuration, if the subunit can be fitted to the human body and contacted to the skin.

In FIG. 11, the command signal receiving arrangement comprises the antenna 63, the second hybrid circuit 119, the command signal receiving circuit 121, the waveform shaping circuit 123, the command signal collating circuit 125, the command signal setting circuit 127, and the main CPU 65.

In addition, the message transmitting arrangement comprises the main CPU 65, the transmitting signal switching circuit 117, the transmitting signal processing circuit 53, the transmitter 43, the first hybrid circuit 41, and the antenna 39.

In FIG. 12, the command signal transmitting arrangement comprises the subsidiary CPU 83, the command signal transmitting circuit 137, the subunit hybrid circuit 133 and the antenna 75.

If the bearer can not select a silent mode, only the main wireless unit can be used as a portable telephone set.

In the third embodiment, just described, the subunit comprises the command signal transmitting arrangement for transmitting the subsidiary radio signal as a command signal to the main wireless unit. The main wireless unit comprises the command signal receiving arrangement for receiving the command signal from the subunit, the voice message memory for memorizing a predetermined message, and an element for automatically onhooking, reading out an message input previously in the memory element, and automatically transmitting the message to the calling subscriber.

The portable telephone set has the advantages of those illustrated in conjunction with FIGS. 2 to 7 and enables the following operations. In a meeting, the bearer can notice reception of a call without attracting the attention of the persons around them and can automatically transmit one of the following messages A, B, and C to the calling subscriber. Such messages may be previously memorized in the voice message memory 131.

Message A "Hold on for a moment, please." (generation of a predetermined melody)

Message B. "I'm sorry that I'm so busy. Please call me back."

Message C. "I'm sorry that I'm so busy. Please call me back 30 minutes later."

When the bearer selects the message A, the bearer quietly gets out of the meeting room, thereafter the bearer can respond to the call from the subscriber outside. In this event, use can be made of the portable telephone set not only while in a meeting but also while working.

Figure 14:
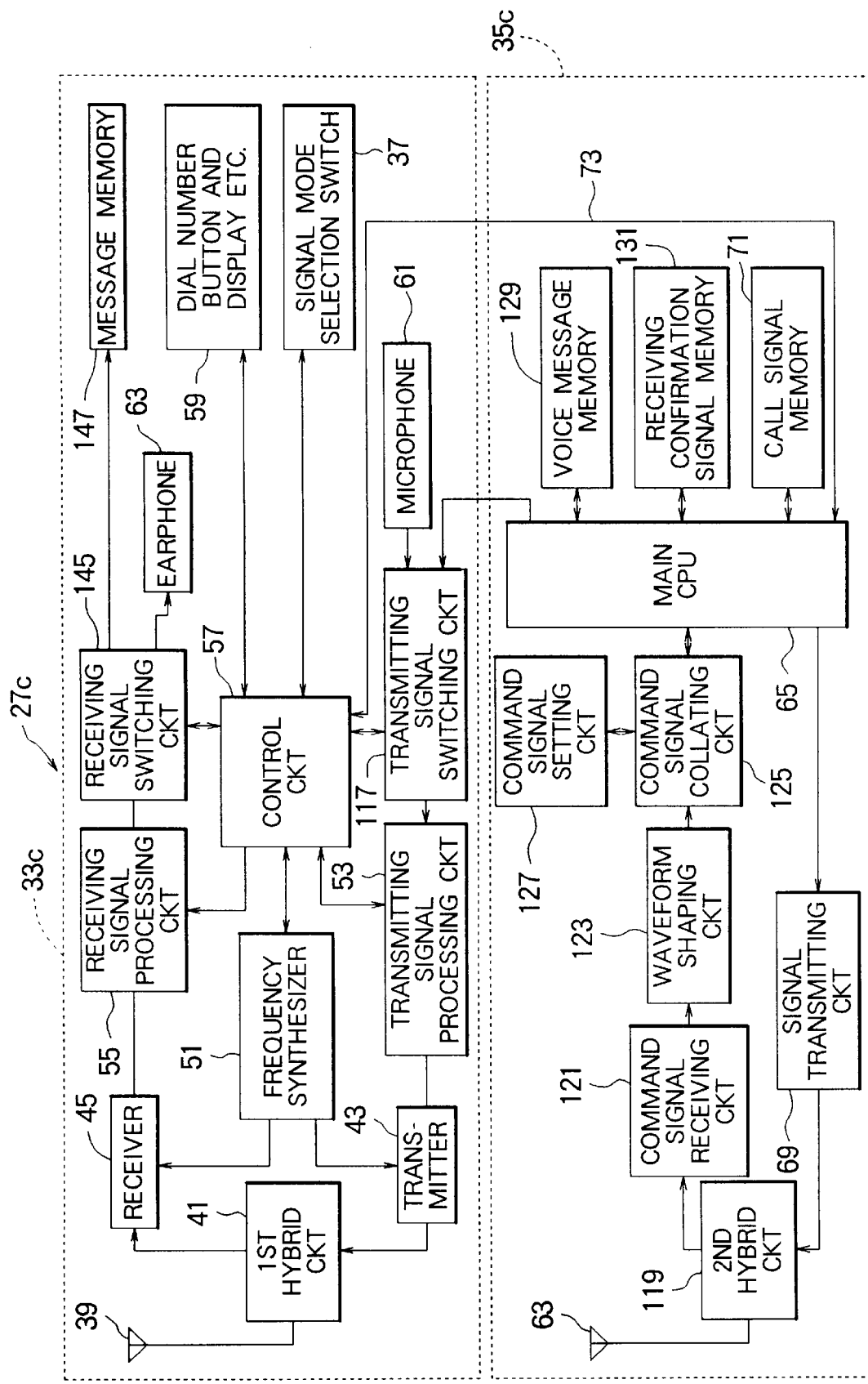
FIG. 14 is a block diagram of a main wireless unit according to a fourth embodiment of the invention.

A portable telephone set according to a fourth embodiment of this invention will be described with reference to FIG. 14. In FIG. 14, the same portions are represented by the same reference numbers mentioned above.

Referring to FIG. 14, a main wireless unit 27c comprises a portable telephone portion 33c and an inner communication circuit portion 35c. The portable telephone portion 33c is similar in structure to that illustrated in FIG. 10 except that both a receiving signal switching circuit 145 and a message memory 147 are included in the portable telephone portion illustrated in FIG. 14. In addition, the inner communication circuit portion 35c is similar in structure to that described in conjunction with FIG. 11.

In the illustrated example, the inner communication circuit portion 35c is operated in a manner to be described later. When the inner communication circuit portion 35c receives a calling signal from the base station 21 and a silent mode is selected by a bearer, the inner communication circuit 35c transmits an alarm signal as a subsidiary radio signal to the subunit 29c. Thus, the subsidiary ratio signal serves to call the subunit 29c. The inner communication circuit 35 further receives, as a subsidiary radio signal, a command signal transmitted from the subunit 29c and automatically transmits, to the calling subscriber, a message signal previously input into the message memory 147.

In addition, the portable telephone set is put either in a telephone answering or a recording mode by the command signal sent from the subunit 29c, when the bearer can not respond to the call. Furthermore, a reception confirmation signal is transmitted from the main wireless unit 27c when the main wireless unit 27c receives a command signal from the subunit 29c.

The telephone answering and recording arrangement comprises a control circuit 57, the main CPU 65, a received signal switching circuit 145, and the voice message memory 147.

The portable telephone set carries out the same operation as the telephone set of FIG. 11 except for the following operation. That is, the operation to transmit a message, for example, "I beg your pardon. I'm busy. Please give me a message after a signal tone."

After transmission of the message, the portable telephone set is put into the telephone answering and recording mode.

A message recording arrangement is formed in a structure which comprises the control circuit 57, the receiving signal switching circuit 145, and the message memory 147.

In the portable telephone portion 27c, when a silent mode is selected and a calling signal of a main radio signal is received from the base station 21 (FIG. 1), the control circuit 57 transmits a control signal to the main CPU 65 through the signal bus 73. When the main CPU 65 receives the control signal, the main CPU reads an alarm signal out of the calling signal memory 71 and transmits the same to the signal transmitting circuit 69. The alarm signal is transmitted as the subsidiary radio signal to the subunit 29c from the signal transmitting circuit 69 through a second hybrid circuit 119 and the antenna 63. Thus, the subunit 29c senses arrival of the calling signal and the bearer is aware of arrival of the calling signal.

When the bearer selects the command signal by the use of the subunit 29c and represents selection of a telephone answering and recording mode, the command signal is received by the antenna 63 as a received command signal.

In the inner communication circuit, the received command signal is sent to the command signal collating circuit 125 through the second hybrid circuit 119, the command signal receiving circuit 121, and the waveform shaping circuit 123. The command signal collating circuit 125 collates the received command signal with the preassigned signal which is set by the command signal setting circuit 127. When the received command signal is identical with the preassigned signal, the voice message memory 129 reads out a voice message which corresponds to the command signal and which may be, for example, "I'm sorry but I'm busy. Please give me your message after a signal tone. Pee . . . ".

Instantly, the voice message is transmitted to the control circuit 57 through a signal bus 73. The control circuit 57 is energized to switch a transmitting signal switching circuit 117 from a side of the microphone 61 to a side of the main CPU 65.

Thereafter, the main CPU 65 transmits the read out voice message to the transmitting signal switching circuit 117. The read out voice message is automatically transmitted to the calling subscriber through the transmitting signal switching circuit 117, the transmitting signal processing circuit 53, the transmitter 43, the first hybrid circuit 41, and then the antenna 39. Thereafter, at an appropriate time, a control signal, which switches from a terminal of the earphone 63 to that of the message memory 147 made of a tape recorder or memory, is generated from the control circuit 57 and is input to the receiving signal switching circuit 145.

The message which is given from the calling subscriber is memorized in the message memory 147. At the same time, it is indicated by an indicating element of the subunit 29c that the message memory 147 has memorized the message of the subscriber. In addition, after the message is automatically recorded in response to a call by the subscriber, an end signal is transmitted from the control circuit 57 to the main CPU 65 through the signal bus 73. Responsive to the end signal, the main CPU 65 reads a confirmation signal out of the receiving confirmation signal memory 131 and transmits the same to the signal transmitting circuit 69. The confirmation signal is transmitted from the antenna 63 to the subunit 29c through the signal transmitting circuit 69, and the second hybrid circuit 119.

The main wireless unit 27c then assumes a standby state, awaiting reception again. The transmitting signal switching circuit 117 is switched automatically to a terminal of the microphone 61. In addition, the receiving signal switching circuit 145 is switched on automatically to a terminal of the earphone 63. When the bearer does not select the silent mode, the main wireless unit 27c can be used as an ordinary portable telephone set.

According to the present invention, the subunit has a transmitting element for transmitting command signals to the main wireless unit, which has a recording element for answering a call and recording a message from a calling subscriber, when the main wireless unit receives a preassigned command signal from the subunit.

In the portable telephone set above described, the advantages expected from the telephone device described in connection with FIG. 11 are achieved, and a message from a calling subscriber is recorded when the bearer cannot respond to the call immediately.

A portable telephone set according to a fifth embodiment of this invention will now be described with reference to FIGS. 15 to 18, in which the same portions are described by the same reference numbers as FIGS. 2 to 14 mentioned above.

Figure 15:
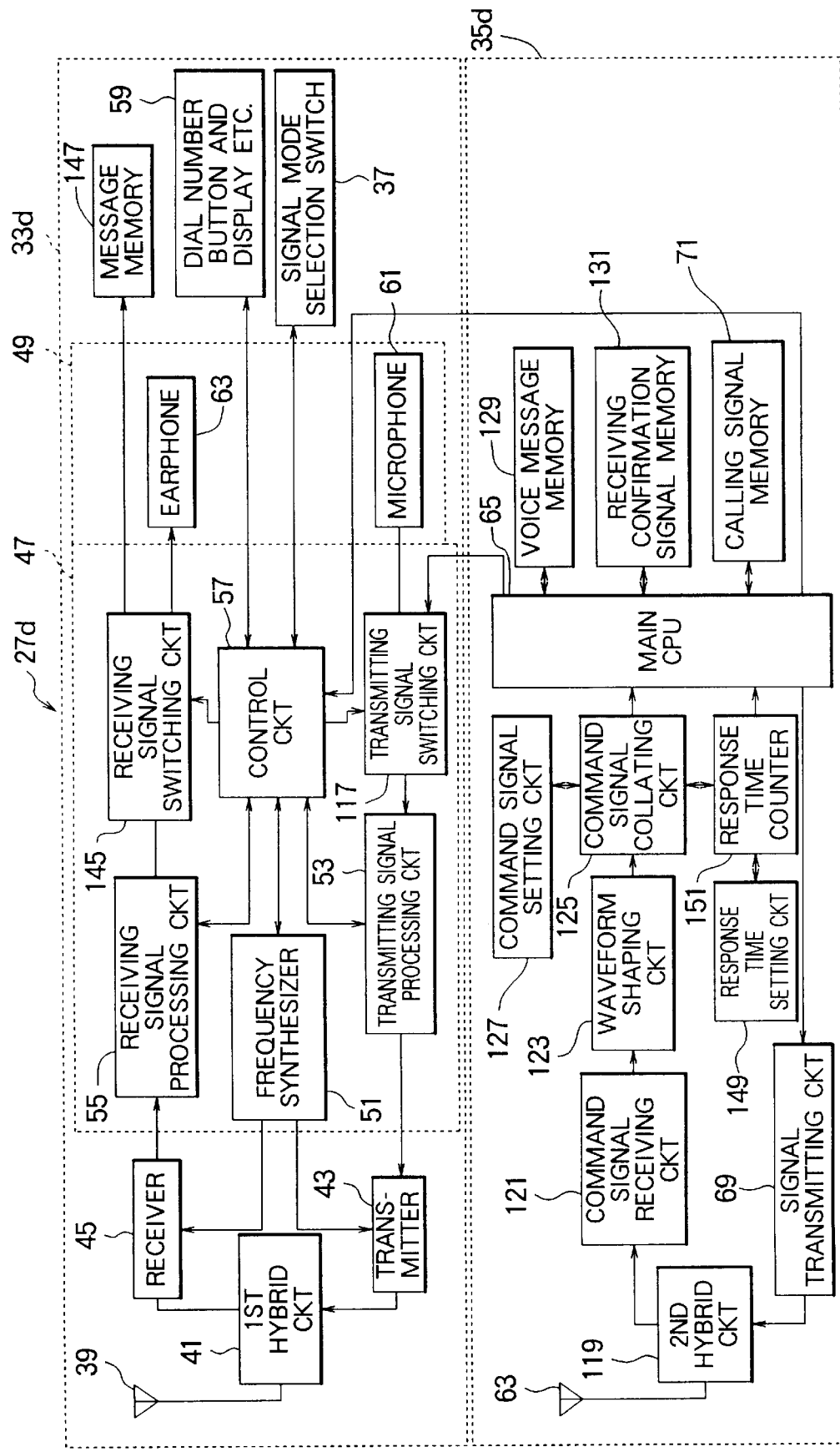
FIG. 15 is a block diagram of a main wireless unit according to a fifth embodiment of this invention.

Referring to FIG. 15, the main wireless unit 27d is the same as the main wireless unit 27c described with reference to FIG. 14 except that a response time setting circuit 149 and a response time counter 151 are added to the inner communication circuit portion 35d. The response time setting circuit 149 and the response time counter 151 together with the CPU 65 and the control circuit portion 47 form an absent informing arrangement. As will be later described in detail, the absent informing arrangement repeatedly informs the subunit of reception of the call signal when the main wireless unit receives the call signal from a subscriber. The absent informing arrangement also transfers to the telephone answering mode when the main wireless unit does not receive a response from the subunit for a time longer than a predetermined time, and records a message from the calling subscriber and to the subunit at a predetermined time period.

The portable telephone set is operated in a manner described hereinunder and comprises a telephone answering and recording arrangement different from that of FIG. 14.

The counter 151 counts a required time from transmission of an alarm signal to reception of the command signal. When the counted time is longer than a setting time set by the response time setting circuit 149, the portable telephone set enters the telephone answering and recording mode.

The subunit 29d according to the fifth embodiment has the same structure as that illustrated in a plan view of FIG. 4. The side view of the subunit 29d is shown in FIG. 16.

Figure 16:
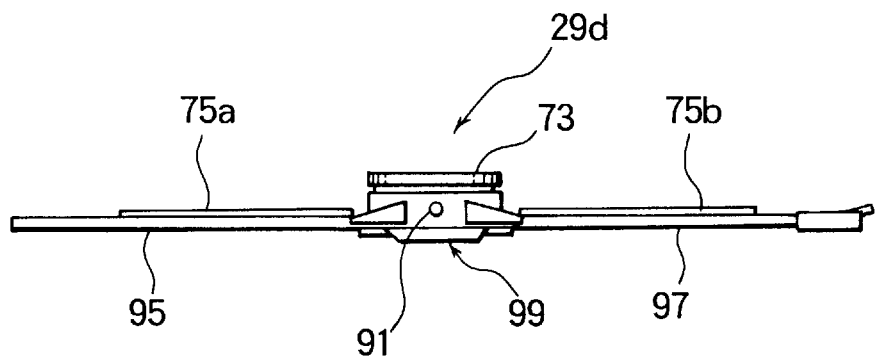
FIG. 16 is a side view of a subunit coupled to the main wireless unit of FIG. 15.
Figure 17:
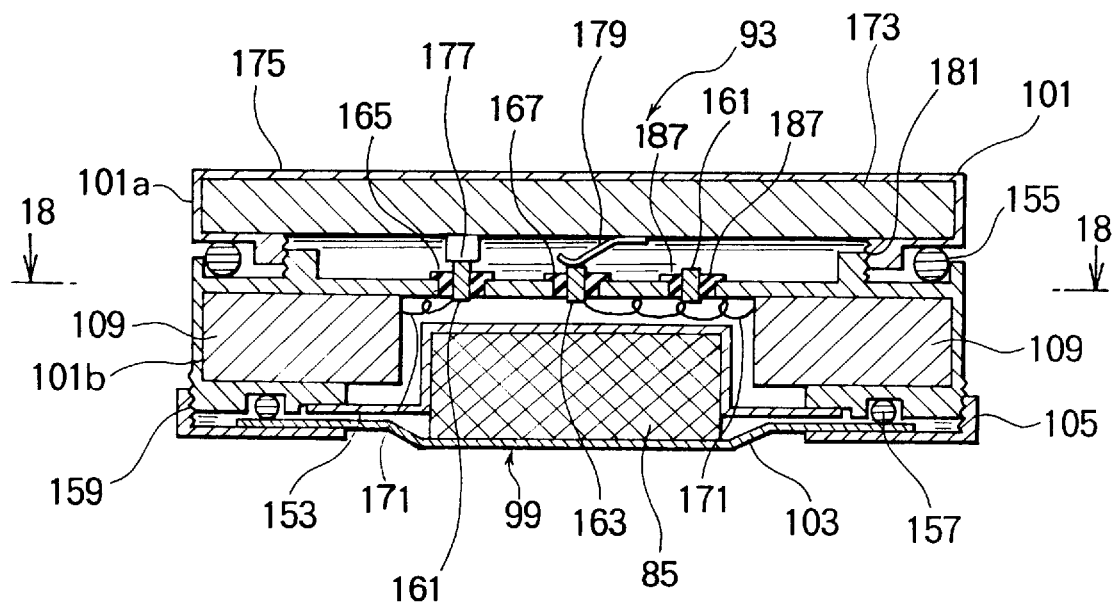
FIG. 17 is a sectional view of the subunit of FIG. 16.

Referring to FIGS. 16 and 17, the subunit 29d comprises a vibrating cylindrical casing 93, belts 95 and 97, a reset switch 91, a contacting portion 99 to contact the body of a bearer, and antenna portions 75a and 75b. The antenna portions 75a and 75b are made of metal formed on an opposite side to the human body when the subunit 29d is fitted to the wrist in a manner described in conjunction with FIGS. 4 to 6.

Referring to FIG. 17, the vibration cylindrical casing 93 comprises a cylindrical portion 101, a vibration plate 103, and a bottom plate 105. The vibration cylindrical casing 93 also includes a divisional plate 153, a vibrator 85, and an electrical circuit portion 109. The cylindrical portion 101 comprises an upper cylindrical portion 101a and a lower cylindrical portion 101b which is screwed into the upper cylindrical portion 101a. Between the upper and the lower cylindrical portions is located an O-ring 155. In addition, the vibration plate 103 is formed by an elastic thin film and is fitted together with an elastic O-ring 157 between the cylindrical portion 101 and the bottom plate 105 and is fixed by a screw portion 159 of the bottom plate 105 and the cylindrical portion 101.

To obtain electrical contact of the electrical circuit 109 and the vibrator 85 with a charging battery unit 173, the subunit 29d has electrodes 161 and 163 each of which is insulated by insulators 165 and 167. The electrodes 165 and 167 are connected to the electrical circuit portion 109 through lead wires 169 and 171, respectively.

Figure 18:
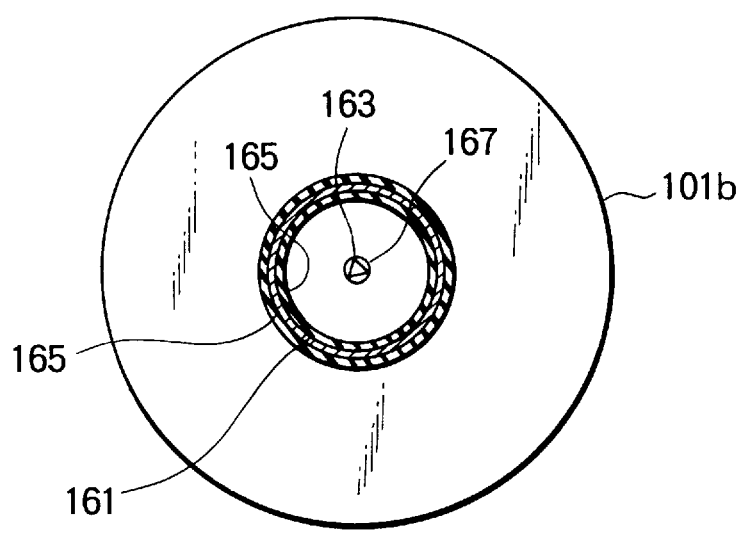
FIG. 18 is a sectional view of the subunit taken along a line 18—18' of FIG. 17.

In FIGS. 17 and 18, the charging battery unit 173 comprises a charging battery portion 175, and electrodes 177 and 179 made of an elastic material, such as phosphor bronze or the like, all of which are contained in the upper cylindrical portion 101a. The charging battery portion 175 is connected to a part contained by a lower cylindrical portion 101b through the O-ring 155 by the screw portion 181.

In the structure of the subunit 29d being described, the charging battery unit 173 is capable of being fitted and removed together with the upper cylindrical portion 101a in reference with the subunit body, i.e., the lower cylindrical portion 101b. When the subunit 29d is not used, the charging battery unit 173 can be subjected to charging or recuperating. On the other hand, when the subunit 29d is used, the charging battery unit 181 is fitted to the subunit body. In addition, a water-proof structure can be accomplished by the O-rings 155 and 157. The subunit 29d may be another shape than that described in FIGS. 4 to 6 and 7 to 9, as far as the subunit 29d can be fitted to a wrist of the bearer. Such a water-proof structure enables the subunit 29d to be used when taking a bath, bathing in the sea, or playing a sport like swimming indoors.

Turning back to FIG. 15, operation of the portable telephone set according to the fifth embodiment will be described. When the portable telephone set is set in the telephone answering and recording mode, the message of "I'm sorry but I'm very busy now. Please leave a message after a voice signal. Pee . . . " is read out by the arrangement of the response time setting circuit 149 and the response time counter 151. Immediately, a control signal is transmitted from the main CPU 65 connected to the counter 151 and to a control circuit 57 through the signal bus 73. Then, the control circuit 57 on-hooks and turns the transmitting signal switching circuit 117 from a terminal of transmitter 43 to that of the main CPU 65. Thereafter, the main CPU 65 transmits the readout voice message to a transmitting signal switching circuit 117 so that the voice message becomes the main radio signal through the transmitting signal processing circuit 53, the transmitter 43, and the first hybrid circuit 41. Then, the main radio signal is automatically transmitted from the antenna 39 to a calling subscriber. Thereafter, the control circuit 57 generates a control signal at an appropriate time and switches the receiving signal turning circuit 145 from a side of the earphone 63 to a side of a message memory 147, which is a tape recorder or a memory device. A message subsequent to the voice signal of the main wireless unit from the calling subscriber is recorded in the message memory 147. In addition, immediately, an indicating portion is indicated by "an existence of message", and the control circuit 57 transmits a calling signal. The calling signal is transmitted for a predetermined time period to save the capacity of the charging battery unit. This operation continues up to receiving a command signal from the subunit 29d. When a command signal is received from the subunit 29d, the portable telephone set again enters a standby state, awaiting reception.

When the main wireless unit receives a main radio signal transmitted from the base station, the main wireless unit transmits an alarm signal to the subunit repeatedly.

The main wireless unit comprises an informing arrangement such that when the main wireless unit does not receive a command signal responding to the alarm signal from the subunit in a time longer than a predetermined time period, the main wireless unit transfers to a telephone answering mode in which a message of the calling subscriber is recorded and thereafter the main wireless unit informs the subunit in a predetermined time period.

The portable telephone set described above in conjunction with FIGS. 15 through 18 is advantageous because it prevents important phone calls from being missed.

In addition, using this structure the AM band can be used for subunit communication circuit 35d, which can transmit a relatively long distance using a small amount of power.

What is claimed is:

1. A portable radio telephone set comprising:
   a main wireless unit for transmitting and receiving call signals, said main wireless unit having a silent mode for selectively generating an alarm signal in response to receiving a preassigned call signal without generating a ringing tone; and
   a pager subunit, remote from and coupled to said main wireless unit, for mutually communicating with said main wireless unit, said pager subunit receiving said alarm signal only when said main wireless unit is in the silent mode, to produce an indication at the subunit that the main wireless unit has received a preassigned call signal, and said pager subunit having a silent mode for producing a non-audible indication that the main wireless unit has received a preassigned call signal.

2. A portable radio telephone set as claimed in claim 1, wherein said pager subunit is electromagnetically coupled to said main unit.

3. A portable radio telephone set as claimed in claim 2, wherein said main wireless unit comprises:
   alarm signal transmitting means provided in said main wireless unit for transmitting said alarm signal to said pager subunit when said main wireless unit receives said call signal; and alarm signal receiving means provided in said pager subunit for receiving said alarm signal.

4. A portable radio telephone set as claimed in claim 3, wherein said main unit further comprises:

command signal receiving means for receiving a plurality of command signals comprising a predetermined command signal directing said main wireless unit to make a response to a calling signal of a calling subscriber when said main unit receives said command signal from said subunit;

memory means for memorizing at least one message comprising a first message corresponding to said first predetermined command signal; and message transmitting means for reading out said first message from said memory means and for automatically transmitting said first message to said calling subscriber;

said pager subunit further comprising:

command signal transmitting means for transmitting said plurality of command signals comprising said first predetermined command signal to said main wireless unit when said alarm signal receiving means receives said alarm signal.

5. A portable radio telephone set as claimed in claim 4, wherein said main wireless unit further comprises recording means for transferring said main wireless unit from a receiving mode to a telephone answering mode and for recording a message of said calling subscriber when said main wireless unit receives a second predetermined command signal so as to change said main wireless unit to said telephone answering mode from said pager subunit.

6. A portable radio telephone set as claimed in claim 5, wherein said main wireless unit further comprises:

absent informing means for repeatedly informing said pager subunit of reception of said call signal when said main wireless unit receives said call signal from said calling subscriber and for transferring to said telephone answering mode when said main wireless unit does not receive a response from said pager subunit for a time longer than a predetermined time and for recording a message from said calling subscriber and thereafter informing said pager subunit of said message at a predetermined time.

7. A portable radio telephone set as claimed in claim 4, wherein said main wireless unit further comprises:

confirmation signal transmitting means for transmitting a confirmation signal to said pager subunit after said main wireless unit receives one of said plurality of command signals from said pager subunit; and said pager subunit further comprises:

confirmation signal receiving means for receiving said confirmation signal, and indicating means for indicating reception of said confirmation signal to a user of said pager subunit.

8. A portable radio telephone set as claimed in claim 3, wherein said pager subunit further comprises stimulus providing means for providing a stimulus to a user's body when said alarm signal receiving means receives said alarm signal.

9. A portable radio telephone set as claimed in claim 8, wherein said stimulus providing means comprises a piezoelectric transducer for generating a vibration in contact with said user's body.

10. A portable radio telephone set as claimed in claim 9, wherein said pager subunit further comprises fitting means for fitting said stimulus providing means to said user's body.

11. A portable radio telephone set as claimed in claim 10, wherein said pager subunit has a waterproof structure.

12. A portable radio telephone set as claimed in claim 1, wherein said pager subunit is coupled to said main wireless unit through a lead line.

13. A main wireless unit of a portable radio telephone set for transmitting and receiving call signals comprising:

an alarm element having a silent mode for selectively generating an alarm signal without generating a ringing tone in response to said main wireless unit receiving a preassigned call signal; and alarm signal transmitting means for transmitting said alarm signal to a pager subunit electrically coupled to said main wireless unit, and remote from said main wireless unit, for mutually communicating with said main wireless unit only when said main wireless unit receives said call signal and said alarm element is in said silent mode.

14. A main wireless unit as claimed in claim 12, further comprising:

command signal receiving means for receiving a plurality of command signals comprising a first predetermined command signal and which are transmitted from said pager subunit;

memory means for memorizing at least one message comprising a first message corresponding to said first predetermined command signal, and message transmitting means for reading out said first message from said memory means and for automatically transmitting said first message to a calling subscriber when said main wireless unit has received a call signal from said calling subscriber.

15. A main wireless unit as claimed in claim 14, further comprising:

recording means for converting said main wireless unit from a receiving mode to a telephone answering mode and recording a message of said calling subscriber when said main wireless unit receives a second predetermined command signal from said pager subunit to change said main wireless unit to said telephone answering mode.

16. A main unit as claimed in claim 15, wherein said main wireless unit further comprises:

absent informing means for repeatedly informing said pager subunit of reception of said call signal when said main wireless unit receives said call signal from said calling subscriber and for transferring to said telephone answering mode when said main wireless unit does not receive a response from said pager subunit for a time longer than a predetermined time and for recording a message from said calling subscriber and thereafter informing said pager subunit of said message at a predetermined time.

17. A main wireless unit as claimed in claim 14, further comprising confirmation signal transmitting means for transmitting a confirmation signal to said pager subunit after said main wireless unit receives one of said plurality of command signals from said pager subunit.

18. A pager subunit of a portable radio telephone set, said portable radio telephone set comprising a main wireless unit for transmitting and receiving call signals and having a silent mode for selectively generating an alarm signal in response to reception of a call signal from a subscriber without generation of a ringing tone, said pager subunit, remote from said main wireless unit, for mutually communicating with said main wireless unit only when said alarm element is in said silent mode, said subunit comprising:

alarm signal receiving means for receiving said alarm signal transmitted from said main wireless unit by the use of a radio signal or an electrical signal.

19. A pager subunit as claimed in claim 18, further comprising command signal transmitting means for transmitting a plurality of command signals comprising a first predetermined command signal to said main wireless unit.

20. A pager subunit as claimed in claim 17, further comprising stimulus providing means for providing a stimulus to a human body of a user when said alarm signal receiving means receives said alarm signal.

21. A pager subunit as claimed In claim 18, wherein said stimulus providing means consists essentially of a piezoelectric transducer to give a vibration as said stimulus to said human body.

22. A pager subunit as claimed in claim 19, having a waterproof structure being formed like wrist watch and further comprising fitting means for fitting said subunit to said human body, wherein said fitting means is a belt.

23. A pager subunit as claimed in claim 19, further comprising confirmation signal receiving means for receiving a confirmation signal from said main wireless unit after said main wireless unit receives one of said plurality of command signals from said pager subunit, and indicating means for indicating reception of said confirmation signal to a user of said pager subunit.

\* \* \* \* \*